(12) United States Patent
Chernin et al.

(10) Patent No.: US 10,354,544 B1
(45) Date of Patent: Jul. 16, 2019

(54) PREDICTING STUDENT PROFICIENCIES IN KNOWLEDGE COMPONENTS

(71) Applicant: Snapwiz Inc., Fremont, CA (US)

(72) Inventors: Lawrence Chernin, Fremont, CA (US);
Sriram Cherukuri, San Jose, CA (US);
Aditya S. Agarkar, Fremont, CA (US);
Nishanth Upadhyay, Bangalore (IN)

(73) Assignee: Snapwiz Inc., Fremont, CA (US)

( * ) Notice: Subject to any disclaimer, the term of this patent is extended or adjusted under 35 U.S.C. 154(b) by 605 days.

(21) Appl. No.: 15/048,640

(22) Filed: Feb. 19, 2016

Related U.S. Application Data

(60) Provisional application No. 62/118,929, filed on Feb. 20, 2015.

(51) Int. Cl.
*G09B 7/06* (2006.01)
*G06N 5/04* (2006.01)

(52) U.S. Cl.
CPC .................. G09B 7/06 (2013.01); 06N 5/04 (2013.01)

(58) Field of Classification Search
CPC .................................................. G09B 7/06
See application file for complete search history.

(56) References Cited

U.S. PATENT DOCUMENTS

| 8,491,311 | B2 * | 7/2013 | Bodner | G09B 7/00 434/118 |
| 2003/0017442 | A1 * | 1/2003 | Tudor | G09B 7/04 434/322 |
| 2012/0214147 | A1 * | 8/2012 | Ernst | G09B 7/00 434/353 |

* cited by examiner

*Primary Examiner* — Reginald A Renwick
(74) *Attorney, Agent, or Firm* — Park, Vaughan, Fleming & Dowler LLP; Laxman Sahasrabuddhe

(57) ABSTRACT

Embodiments of the present invention allow an online course to predict proficiency of knowledge components using student responses to assessment items. In some embodiments, assessment items are tagged with metadata, such as associated knowledge component, difficulty, and depth of knowledge. Initially the author or subject matter expert supplies these values. Students then answer the assessment items. During an assessment, the student responses are automatically evaluated for correctness. Each student response receives a score between 0 and 1; where 1 corresponds to a completely correct response and 0 an incorrect response. Student proficiency can be predicted at any time using the student's up-to-date assessment item response history. Some embodiments use Samejima's Continuous Response Model (CRM), which is a special case of an Item Response Theory (IRT). Question metadata such as question difficulty, difficulty of knowledge component, impact of learning gain and retention is used to predict the most recent proficiency.

19 Claims, 8 Drawing Sheets

| Ch 5: Forms of Business Owner... | | Proficiency | | Performance |
|---|---|---|---|---|
| Discuss why most businesses are small businesses. | | | 77% | |
| Determine the contributions of small businesses to t... | | | 61% | 11/17 |
| Discuss why small businesses fail. | | | 83% | 5/6 |

FIG. 6

PREDICTING STUDENT PROFICIENCIES IN KNOWLEDGE COMPONENTS

RELATED APPLICATION

This application is a non-provisional of, and claims priority under 35 U.S.C. § 119 to, U.S. Provisional Patent Application No. 62/118,929, filed on 20 Feb. 2015, entitled "Method and System to Predict Learner Proficiencies in Knowledge Components," by inventors Sriram Cherukuri, Aditya Agarkar, and Nishanth Upadhyay, which is herein incorporated by reference in its entirety for all purposes.

BACKGROUND

Technical Field

The present invention relates to online learning assessments. More specifically, embodiments of the present invention relate to predicting student proficiencies in certain specific knowledge components using online assessments. The predicted values of proficiencies for multiple knowledge components create a knowledge profile for each student. The personalized knowledge profile of the student drives the personalized content recommendations to bridge the identified knowledge gaps.

Related Art

Online courses typically have hundreds of knowledge components that are hierarchically organized as units or chapters. These knowledge components typically comprise a skill or learning objective that a student must master in order to meet course objectives. Proficiency in a particular knowledge component involves quantitatively measuring how much the student has learned the particular knowledge component. More specifically, proficiency in a particular knowledge component is the probability that a student can successfully solve a problem designed to assess the particular knowledge component.

Proficiency in a knowledge component in an online course is typically measured using computer adaptive online assessment. During the assessment, the student responses are evaluated after each assessment item is answered to measure proficiencies in various knowledge components. The subsequent assessment items and remedial content are recommended to the student based on how much the student has mastered each particular knowledge component. Therefore, accurate prediction of student's proficiency in different knowledge component is critical for a personalized course.

Accurate prediction of a student's proficiency and its application in a personalized course has numerous challenges. For example, sparse student response presents a significant challenge to predicting a student's proficiency. Accurate prediction may be possible if a student has answered sufficiently large number of assessment items that assess a knowledge component. However, in order to optimize the time available during the assessment and begin content recommendation for the student, proficiency prediction is required based on student responses to only a few assessment items.

A second challenge associated with accurate prediction of a student's proficiency involves proficiency prediction during ongoing learning. For example, proficiency prediction models such as Item Response Theory (IRT) are widely available for computer adaptive testing. Models such as IRT, use student responses to predict proficiency at the course level. These models are good for capturing overall student proficiency in a course at a given time. Therefore, such models are popular for standardized testing and summative reporting of student performance in a course, when a grade or a percentile score is needed. However, during the formative part of the course while students are constantly learning and mastering knowledge components, these models are not very useful. In order to recommend appropriate content, it is important to know if a student has learned a knowledge component or not.

Finally, mastery of concepts presents problems with traditional proficiency prediction systems. Traditional proficiency prediction models, such as IRT, tend to categorize students along a normal distribution bell curve for the population. For standardized testing, such as the SAT or the GMAT, or the summative part of the course, this approach works. However, traditional proficiency prediction systems are not very helpful for the formative part of the course when the students are engaged in acquiring knowledge.

SUMMARY

Embodiments of the present invention allow an online course to predict proficiency of knowledge components using student responses to assessment items. For the formative part of the course, when the students are engaged in acquiring knowledge, a mastery based proficiency prediction model is needed. Note that a mastery based proficiency model is a two state model that predicts if a student has mastered a knowledge component or not. Relative performance of the student with respect to other students is not critical during this part of the course. Also, it is important to note that past student responses are not as informative as more recent responses. Knowledge retention also presents a challenge associated with accurate prediction of a student's proficiency. Moreover, the student's proficiency in a knowledge component declines over time if the student is not exposed to the knowledge component. Traditional proficiency prediction models do not model knowledge retention.

In some embodiments, assessment items are tagged with metadata, such as associated knowledge component, difficulty, and depth of knowledge. Initially the author or subject matter expert supplies these values. Students then answer the assessment items. During an assessment, the student responses are automatically evaluated for correctness. Each student response receives a score between 0 and 1; where 1 corresponds to a completely correct response and 0 an incorrect response. A partially correct response receives a score between 0 and 1.

Note that, in some embodiments, students may also use hints to answer the assessment items. Consumption of a hint reduces the student score based on hint usefulness. Also note that, since students are learning and answering assessment items on an ongoing basis, the most recent responses of the student are weighted more than the older responses. Student proficiency can be predicted at any time using the student's up-to-date assessment item response history. Some embodiments of the present invention use Samejima's Continuous Response Model (CRM), which is a special case of an Item Response Theory (IRT). Question metadata such as question difficulty, difficulty of knowledge component, impact of learning gain and retention is used to predict the most recent proficiency.

Some embodiments of the present invention include a "fast predict" method that prioritizes proficiency prediction response time over accuracy. The fast predict proficiency is used while the student is taking an assessment and designed for a situation where the student does not have to wait for a long response time to get the next assessment item recommendation. Note that this comprises a significant improvement to the assessment system because less resources are utilized in determining the user's proficiency.

In addition, some embodiments also classify an individual student's knowledge components as "mastered" or "not mastered". The invention uses a dynamic proficiency cutoff score for each knowledge component. The proficiency cutoff score is dynamically determined based on the difficulty of a given knowledge component. A student who has mastered a knowledge component is expected to answer an average difficulty assessment item involving the knowledge component with certain "cutoff" probability. Note that in some embodiments, on a periodic basis, the assessment item metadata required for predicting student proficiencies are "machine learned" and updated using the assessment item responses from all students.

One embodiment of the present invention provides a system for calculating proficiency scores for a plurality of users in one or more knowledge components in a course based on sparse responses to personalized assessments over time. During operation, for each assessment item in an assessment comprising a plurality of assessment items designed to assess proficiency in the one or more knowledge components in the course, the system performs at least the following operations: First, the system presents, via a graphical user interface (GUI) of the computer, the assessment item to a user. Next, the system receives, via the GUI, a response to the assessment item from the user. The system then retrieves, by using a proficiency computing module, assessment item metadata associated with the assessment item, a user knowledge profile associated with the user, and course metadata associated with the course. Next, the system calculates, by using the proficiency computing module, a proficiency score based on the response, the assessment item metadata, the user knowledge profile, and course metadata, wherein the proficiency score is associated with the user and a knowledge component corresponding to the assessment item. The system then updates, by using the proficiency computing module, the user knowledge metadata and the assessment item metadata based on the response and the proficiency score. Finally, the system updates, by using a parameter learning module, course metadata based on responses from the plurality of users to the plurality of assessment items.

In some embodiments of the present invention, when the system calculates the proficiency score, the system applies a decay function to the user knowledge profile, wherein the proficiency computing module assigns lower weights to past item scores to capture the impact of knowledge decay.

In some embodiments of the present invention, when the system calculates the proficiency score, the system applies a learning impact function to the user knowledge profile wherein the proficiency computing module assigns higher weights to more recent scores to capture the impact of recent learning.

In some embodiments of the present invention, when the system updates the course metadata, the parameter learning module applies a learn function to the course metadata, wherein the learn function analyses a plurality of student responses for each assessment item that is associated with the one or more knowledge components and updates the assessment item metadata.

In some embodiments of the present invention, when the system updates the course metadata, the system modifies parameters used by the proficiency computing module when calculating the proficiency score.

In some embodiments of the present invention, the proficiency computing module prioritizes proficiency prediction response time over accuracy.

In some embodiments of the present invention, the proficiency computing module prioritizes accuracy over proficiency prediction response time.

In some embodiments of the present invention, the parameter learning module stores initial values for parameters used by the proficiency computing if the actual values for the item parameters are not known.

In some embodiments of the present invention, the parameter learning module corrects for bias in the assessment item metadata if a number of users that answer each assessment item in the assessment item metadata is below a predetermined threshold.

In some embodiments of the present invention, the parameter learning module calculates the assessment item parameters, assessment item difficulties, and assessment item discriminant factors in a batch mode.

In some embodiments of the present invention, the parameter learning module applies a smoothing function to the assessment item parameters.

In some embodiments of the present invention, the proficiency computing module: calculates a mixed score which compares the proficiency score to a combination of a mean of all responses to the assessment item and a mean of all expected responses to the assessment item; and displays the mixed score to the user.

BRIEF DESCRIPTION OF THE FIGURES

FIG. 6 illustrates a skill assessment report in accordance with an embodiment of the present invention.

DETAILED DESCRIPTION

Figure 1:
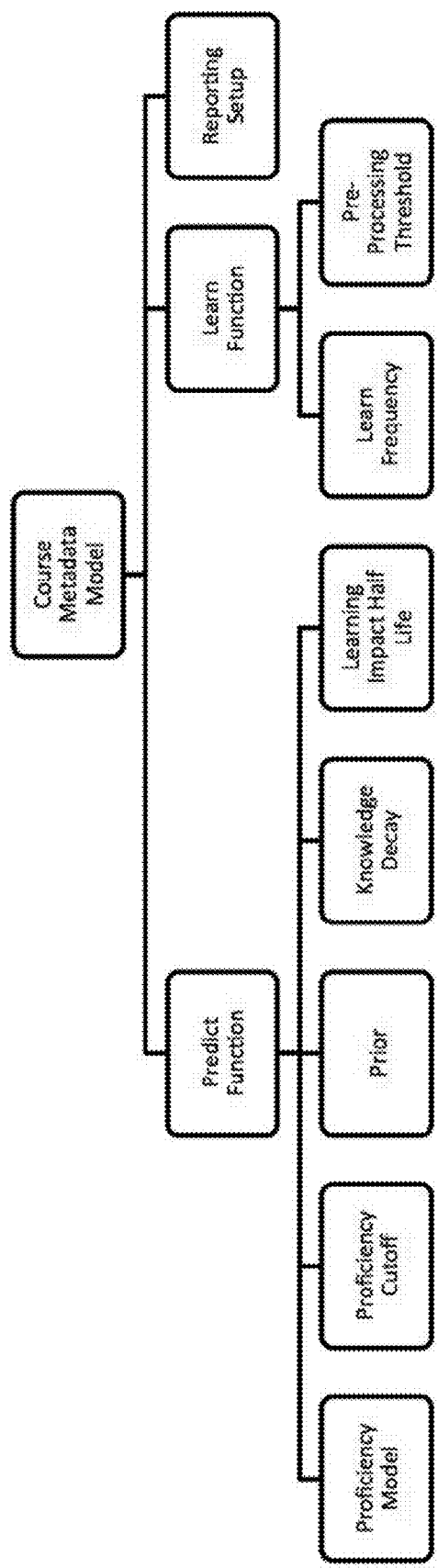
FIG. 1 illustrates course level metadata in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The following description of some embodiments of the present invention are not intended to be exhaustive or to limit the present invention to the forms disclosed. Accordingly, many modifications and variations will be apparent to practitioners skilled in the art.

The following terms are used throughout the following discussion. A "course" is a structured and curated series of instructional and assessment material about a particular subject delivered in a classroom or online. A "knowledge component" is a skill or a learning objective of a course. A course often covers many different knowledge components. An "assessment item" is a construct, typically a question or a challenge, designed to assess a knowledge component. An "assessment" is a group of assessment items designed to assess student proficiency. An assessment is commonly referred as a test, examination, quiz, etc. The term "proficiency" refers to a latent quantitative measure of a student's skill in a knowledge component. Mathematically, proficiency is assumed to be normally distributed among the population with a mean of 0 and standard deviation of 1. Thus, the proficiency scale typically ranges from −5 to +5 with a mean of 0. "Item Response Theory (IRT)" is based on the idea that the probability of a correct response to an assessment item is a mathematical function of a student and assessment item parameters. The student parameters are the student's proficiency, whereas assessment item parameters can include difficulty of the assessment item, ease of guessing, and discriminant factors. A "scaled proficiency" can be computed by converting the proficiency to a score between 0 and 100 using a cumulative normal distribution function. Note that scaled proficiency is equivalent to a percentile score. A "mastery cutoff score" is a cutoff score expressed as % score to classify students as "Mastered" or "Not Mastered" for a knowledge component. The "metacognitive level" is the student's self-rating about their proficiency in a knowledge component. The term "prior" refers to the prior assumption in the model. For example, in the absence of any other information, the model assumes that a student is an average student with proficiency of 0 (i.e. 50th percentile)

Some embodiments comprise three different components which are called the continuous response model, the predict function, and the learn function. First, these components are described at a high level and then additional details of each of these components are described.

Continuous Response Model:

An embodiment can rely on continuous responses to the assessment items (i.e. the point scored by the user, which is a value anywhere between 0 and 1). This embodiment also makes a tradeoff between accuracy and robustness. It ensures a fast response, handles the sparse response problem, and uses author specified assessment item metadata when sufficient user responses are not available for machine-learned metadata. In order to measure proficiency in the knowledge component, metadata and model parameters need to be maintained for various entities such as course, knowledge component, assessment items, and users. The model also considers parameter initialization when a course does not have actual student responses to learn the parameters statistically. The continuous response model is described in more detail below.

Predict Function:

The predict function is a runtime component that is called when a student is taking an assessment. The predict function takes the responses from the student as an input, and uses the metadata model to predict student proficiency in a particular knowledge component. The predict function is invoked when the following events are triggered: a) the user answers an assessment item; b) the user completes an assessment; and c) assessment item metadata is updated as a result of the learn function. The predict function is described in more detail below.

Learn Function:

The learn function is typically executed in a batch mode at various intervals. The learn function analyses all student responses for all assessment items that are associated with a knowledge component and updates the metadata model. Note that the metadata model includes assessment item level parameters such as difficulty, discriminant and scaling factor. The learn function is described in more detail below.

Continuous Response Model

This section briefly describes the mathematical model behind the Continuous Response Model (CRM). For more details, see (1) Wang, Tianyou, and Lingjia Zeng. "Item parameter estimation for a continuous response model using an EM algorithm." Applied Psychological Measurement 22.4 (1998): 333-344, and (2) Samejima, Fumiko. "Homogeneous case of the continuous response model." Psychometrika 38.2 (1973): 203-219.

For the following discussion, let $X_{ij} \in (0, 1)$ be the points scored by student i to assessment item j based on the correctness of the response. Any interval can be used in practice and then rescaled in (0, 1). If the boundaries (0 or 1) are observed, simply replace them by $0+\varepsilon$ and $1-\varepsilon$ with a small value of $\varepsilon$ (0.01). The user responses for assessment items are first scored for correctness and then transformed (z-transformed) into an intermediate variable as follows:

$$Z_{ij} = \log\left(\frac{X_{ij}}{1 - X_{ij}}\right) \quad (1)$$

Let $\theta$ be a latent trait that measures student proficiency in the knowledge component with a standard normal $N(0, 1)$ distribution. Given the latent skill of a student ($\theta_i$), and assuming that the student responses are mutually independent, each z-transformed response is the sum of a linear transformation of the latent skill and a measurement error:

$$Z_{ij} = \alpha_j(\theta_i - b_j) + \frac{\alpha_j}{a_j}\varepsilon_{ij} \qquad (2)$$

Where the $\varepsilon_{ij}$ are independent and identically distributed normal standard errors, and $a_j$, $b_j$ and $\alpha_j$ are the item parameters with following definitions:

$b_j$ (the threshold) controls the difficulty of the assessment item.

$a_j$ (the slope) controls the discriminant factor of the assessment item.

$\alpha_j$ (scaling parameter) The scaling parameter does not have any practical meaning. It is a number that represents a scaled transformation linking the original observed score scale to the $\theta$ scale. This is typically defaulted to 1.

The conditional distribution of $Z_{ij}$ given $\theta_i$ is a normal with mean $\alpha_j(\theta_i - b_j)$ and variance of $\alpha_1^2/a_j^2$. It follows that the marginal expectation and variance of $Z_{ij}$ are:

$$E[Z_{ij}] = -\alpha_j b_j \qquad (3)$$

$$\mathrm{Var}(Z_{ij}) = \frac{1 + a_j^2}{a_j^2}\alpha_j^2 \qquad (4)$$

The correlation between $Z_{ij}$ and $\theta_i$ is:

$$\rho(Z_{ij}, \theta_i) = \mathrm{sgn}(\alpha_j)\sqrt{\frac{a_j^2}{1 + a_j^2}} \qquad (5)$$

Based on equations 3, 4, and 5, a simple moment-based estimator of the item parameters can be built:

$$\hat{\alpha}_j = \hat{\sigma}_j \hat{\rho}_j \qquad (6)$$

$$\hat{b}_j = \frac{-\hat{\mu}_j}{\hat{\alpha}_j} \qquad (7)$$

$$\hat{a}_j = \sqrt{\frac{\hat{\rho}_j^2}{1 - \hat{\rho}_j^2}} \qquad (8)$$

Where $\hat{\mu}_j$ and $\hat{\sigma}_j$ are the sample mean and the sample standard deviation of the transformed item response respectively, $\hat{\rho}_j$ is the corrected item-total correlation (the sample correlation between the $Z_{ij}$ and the z-score without the item) and N is the number of students.

$$\hat{\mu}_j = N^{-1}\sum_{i=1}^{N} Z_{ij} \qquad (9)$$

$$\hat{\sigma}_j = \sqrt{\frac{1}{N-1}\sum_{i=1}^{N}(Z_{ij} - \hat{\mu}_j)^2} \qquad (10)$$

To estimate the person parameters, one can build a Bayes modal estimator (BME) that facilitates giving a prior on each person, or the same prior on everyone, or disable the use of a prior and revert to ordinary maximum likelihood.

Let $\theta_i$ have a normal prior with mean $\mu_i$ and variance $1/\lambda_i$, where $\lambda_i \geq 0$. With this parameterization, the use of $\mu_i$, and $\lambda_i = 1$ corresponds to the population prior (standard normal), the use of a greater (lesser) $\mu_i$ indicates reasons to believe that this person has a greater (lesser) skill; the use of a greater (lesser) $\lambda_i$ indicates more (less) confidence in this belief; and setting $\lambda_i = 0$ completely disables the use of a prior and reverts to ordinary maximum likelihood.

Let $Z_i = (Z_{i1}, Z_{i2}, \ldots, Z_{il})$ be the vector of the z-transformed responses of student i and $g_i(\theta_i)$ be the prior probability density function (a normal distribution with mean $\mu_i$ and variance $1/\lambda_i$ where $\lambda_i \geq 0$) and $f_{ij}(z|\theta_i)$ is the conditional probability distribution function of $Z_{ij}$ given $\theta_i$ (a normal distribution with mean $\alpha_j(\theta_i - b_j)$ and variance of $\alpha_j^2/a_j^2$). Then the log of the posterior PDF of $\theta_i$ given $Z_i$ is proportional to (it's the log-likelihood if the prior is flat ($\lambda_i = 0$), hence the l notation):

$$l(\theta_i, Z_i) \sim \log g_i(\theta_i) + \sum_{j=1}^{n} \log f_{ij}(Z_{ij}|\theta_i) \qquad (11)$$

$$-\frac{\lambda_i(\theta_i - \mu_i)^2}{2} - \sum_{j=1}^{n} \frac{a_j^2(Z_{ij} - \alpha_j(\theta_i - b_j))^2}{2\alpha_j^2} \qquad (12)$$

Then the score function is exactly:

$$\frac{\partial}{\partial \theta_i} l(\theta_i, Z_i) = \lambda_i(\theta_i - \mu_i) + \sum_{j=1}^{n} \frac{a_j^2}{\alpha_j}(Z_{ij} - \alpha_j(\theta_i - b_j)) \qquad (13)$$

Equating equation 11 to zero and solving for $\theta_i$ gives the BME estimator:

$$\hat{\theta}_i = \frac{\lambda_i \mu_i + \sum_{j=1}^{n} a_j^2\left(b_j + \frac{Z_{ij}}{\alpha_j}\right)}{\lambda_i + \sum_{j=1}^{n} a_j^2} \qquad (14)$$

The standard error (derived either with the Fisher information or by computing the conditional variance directly) is:

$$SE(\hat{\theta}_i) = \frac{1}{\sqrt{\lambda_i + \sum_{j=1}^{n} a_j^2}} \qquad (15)$$

The confidence interval for the BME estimator can be calculated using the BME estimator, standard error (which is a function of standard deviation and N) and for a given confidence level, say 95%. The 95% confidence interval is given by:

$$CI = \hat{\theta}_i \pm 1.96 \times SE(\hat{\theta}_i) \qquad \langle 16 \rangle$$

Correction for Incomplete and Nonrandom Assessment

In an assessment where not every student responds to every item, the sample mean can be biased, especially if the item was not assigned randomly (for example, the case of an easier item given to student with lower skill).

In these cases, the sample mean is:

$$\hat{\mu}_j = M_j^{-1} \sum_{i=1}^{N} 1_{ij} Z_{ij} \quad \langle 17 \rangle$$

where $1_{ij}$ is 1 if person i was assigned item j, or else it is 0.

$$M_j = \sum_{i=1}^{N} 1_{ij}$$

is the number of students assigned to item j. Taking the expectation of the mean, there is a potential bias:

$$\begin{aligned} \text{Bias}[\hat{\mu}_j] &= E[\hat{\mu}_j] - E[Z_{ij}] \quad \langle 18 \rangle \\ &= M_j^{-1} \sum_{i=1}^{N} E[1_{ij} Z_{ij}] - E[Z_{ij}] \\ &= M_j^{-1} N E[E[1_{ij} \mid \theta_i] E[Z_{ij} \mid \theta_i] - E[Z_{ij} \mid \theta_i]] \\ &= E[(M_j^{-1} N E[1_{ij} \mid \theta_i] - 1) E[Z_{ij} \mid \theta_i]] \end{aligned}$$

which will be zero if and only if $E[1_{ij}|\theta_i]$ is a constant ($M_j/N$), i.e. if the probability assigned to item j is independent of the skill. To lower the bias, a correction term is added to $\hat{\mu}_j$:

$$\hat{\mu}_j^* = \hat{\mu}_j - \left( M_j^{-1} \sum_{i=1}^{N} 1_{ij} \bar{Z}_i - N^{-1} \sum_{i=1}^{N} \bar{Z}_i \right) \quad \langle 19 \rangle$$

where $$\bar{Z}_i = m_i^{-1} \sum_{j=1}^{n} 1_{ij} Z_{ij}$$

is the mean of the z-transformed responses for person i, and $$m_i = \sum_{j=1}^{n} 1_{ij}$$

is the number of items assigned to person i. With this correction, the bias is now:

$$E[(M_j^{-1} N E[1_{ij}|\theta_i] - 1)(E[Z_{ij}|\theta_i] - E[Z_i|\theta_i])] \quad \langle 20 \rangle$$

This bias will be zero on average for an item if $E[1_{ij}|\theta_i]$ is not constant in $\theta_i$.

Item Parameter Smoothing

When $M_j$, the number of persons who have taken item j is low, the quality of the estimated item parameters is going to be low (noisy), and also possibly have extreme values which would cause an undesired skew on the skill predictions. In this instance, the item parameters are smoothed as follows:

$$\tilde{\mu}_j = \omega_j \mu_D + (1-\omega_j) \hat{\mu}_j$$

$$\tilde{\sigma}_j = \omega_j \sigma_D + (1-\omega_j) \hat{\sigma}_j$$

$$\tilde{\rho}_j = \omega_j \rho_D + (1-\omega_j) \hat{\rho}_j \quad \langle 21 \rangle$$

where $\mu_D=0$, $\sigma_D=0.5 \log(\epsilon^{-1}-1)$ and $\rho_D=0.5$ are safe values in case of no responses, and $$\omega_j = 1 - \exp(-M_j^{-1}) \quad \langle 22 \rangle$$

is the smoothing parameter which is 1 for $M_j=0$ and becomes zero as $M_j$ becomes larger. More generally, if a fixed smoothing parameter is added to theta and rho independent of the sample size:

$$\omega_j = 1 - \exp(-h/M_j-g) \quad \langle 23 \rangle$$

where h controls the amount of smoothing for small sample and g controls the fixed amount of smoothing (even for a big sample). The choice of h=1 and g=1 gives the best values in an evaluation against a large online assessment database.

Learning and Decay Model

Unlike standardized tests, students enrolled in a course complete multiple assessments over a span of many days. In order to personalize their learning experience and recommend content appropriate to their proficiency, it is important to know their proficiency at the current time. Therefore, greater weight is given to their more recent performance and a lower weight to prior performance. This ensures that if a student initially was not proficient in a knowledge component and subsequently mastered it, assigning greater weight to more recent item scores captures the learning impact. On the other hand, if a student has previously mastered a knowledge component and has subsequently forgotten it, assigning lower weights to past item scores captures the impact of knowledge decay.

Knowledge Decay:

$$w_{ij} = \text{residual} + \frac{\text{residual}}{1 + \exp(\text{slope} * (t - t_{ij} - \text{halfPoint}))} \quad \langle 24 \rangle$$

Learning Impact:

$$\text{learningImpact}Wt_{ij} = \exp(-\text{halfLife}*(\text{totalResponseCount}-\text{curretResponseIndex})) \quad \langle 25 \rangle$$

Master Based Proficiency Model

In a standardized test, student proficiencies are often represented along a bell curve as a percentile score. This is not very useful for a course where measurement of student aptitude and relative scoring is less important. The predictive assessment of student's mastery in individual knowledge components of a course is much more important. If a student has mastered a knowledge component, it implies reasonable confidence that the student can successfully apply the knowledge component to solve an arbitrary problem involving that knowledge component.

Since the course is adaptive, students do not answer identical sets of assessment items in a similar order. Hence, the raw score for a knowledge component cannot be used as a predictor for student mastery. Under these circumstances, the exemplary embodiment uses a latent trait cutoff $\theta_c$ by solving $T_Z(\theta_c) = Z_c$, where $T_Z(\theta) = E[Z|\theta]$ is the expected Z score given a proficiency and $$Z = n^{-1} \sum_{j=1}^{n} Z_{ij}.$$

Since $Z_{ij}$ is conditional to $\theta_i$ and normally distributed with mean $\alpha_j(\theta_i - b_j)$, then:

$$T_Z(\theta_i) = \frac{1}{n} \sum_{j=1}^{n} \alpha_j(\theta_i - b_j) \quad \langle 26 \rangle$$

$$T_Z(\theta_i) = \overline{\alpha}\theta_i + \overline{\mu} \quad \langle 27 \rangle$$

When $$\overline{\alpha} = n^{-1} \sum_{j=1}^{n} \alpha_j \text{ and } \overline{\mu} = n^{-1} \sum_{j=1}^{n} -\alpha_j b_j$$

If $z_c$ is mastery cutoff on the Z scale, then latent trait cutoff $\theta_c$ can be calculated as:

$$T_Z(\theta_c) = Z_c \quad \langle 28 \rangle$$

$$\overline{\alpha}\theta_c + \overline{\mu} = z_c \quad \langle 29 \rangle$$

$$\theta_c = \frac{z_c + \overline{\mu}}{\overline{\alpha}} \quad \langle 30 \rangle$$

This model allows for a cutoff % on the X-scale ($x_c$). The X-scale cutoff is an easy to understand number (e.g. 50%)—a number which should be a "pass" score for an average difficulty knowledge component. The logit transform can be applied on $x_c$ to get the cutoff on the Z-scale:

$$z_c = \log\left(\frac{x_c}{1 - x_c}\right) \quad \langle 31 \rangle$$

Plugging in the value of $z_c$ in equation 18 reveals the mastery cutoff for a given knowledge component as:

$$\theta_c = \frac{-\log(x_c^{-1} - 1) - \overline{\mu}}{\overline{\alpha}} \quad \langle 32 \rangle$$

The mastery cutoff is now used to classify a student as "Mastered" or "Not Mastered" based on their proficiency scores.

Courses where the student's proficiency needs to be displayed as a number that is easier to understand can be displayed using the more intuitive X-scores.

$$\overline{X}_i = \frac{1}{1 + \exp(-T_z(\theta_i))} \quad \langle 33 \rangle$$

$$= \frac{1}{1 + \exp(-(\overline{\alpha}\theta_i + \overline{\mu}))} \quad \langle 34 \rangle$$

Metadata Model

The metadata model maintains the required information for different entities to compute proficiencies.

Course Metadata

FIG. 1 illustrates course level metadata in accordance with an embodiment of the present invention. The course level information includes the following attributes:

Proficiency Model: Indicates the proficiency model used for proficiency measurement: 1PL IRT, 3PL IRT or CRM.

Proficiency Cut Off: A threshold value used for classifying students as Mastered/Non-Mastered. The proficiency cutoff is a probability threshold for an "Average" knowledge component of the course. If the probability that the student correctly answers any random assessment item for the knowledge component is above this threshold, the student is classified as a "Master".

Prior: The proficiency has a normal prior with the given mean and standard deviation. With no prior information, a flat prior is used by setting the standard deviation to ∞ (i.e. lambda=1/variance=0)

Knowledge Decay: These parameters control how a student's proficiency declines over time. Residual indicates the knowledge retained after a very long time. Slopes dictates the rate of decay. Half-point indicates the time taken for proficiency to reduce to 50% of its initial value.

Learning Impact Half-life: The sequence of responses is weighted exponentially from most recent to least recent. The half-life of the exponential controls the rate at which the weight reduces.

Learn frequency: Indicates how frequently the learn function is invoked to update assessment item parameters.

Preprocessing Threshold: Threshold for low response count is used to control weight given to initial author difficulty vs computed item difficulty. More emphasis is given to author difficulty when the number of responses for a particular assessment item is less than the threshold.

Assessment Item Metadata

Figure 2:
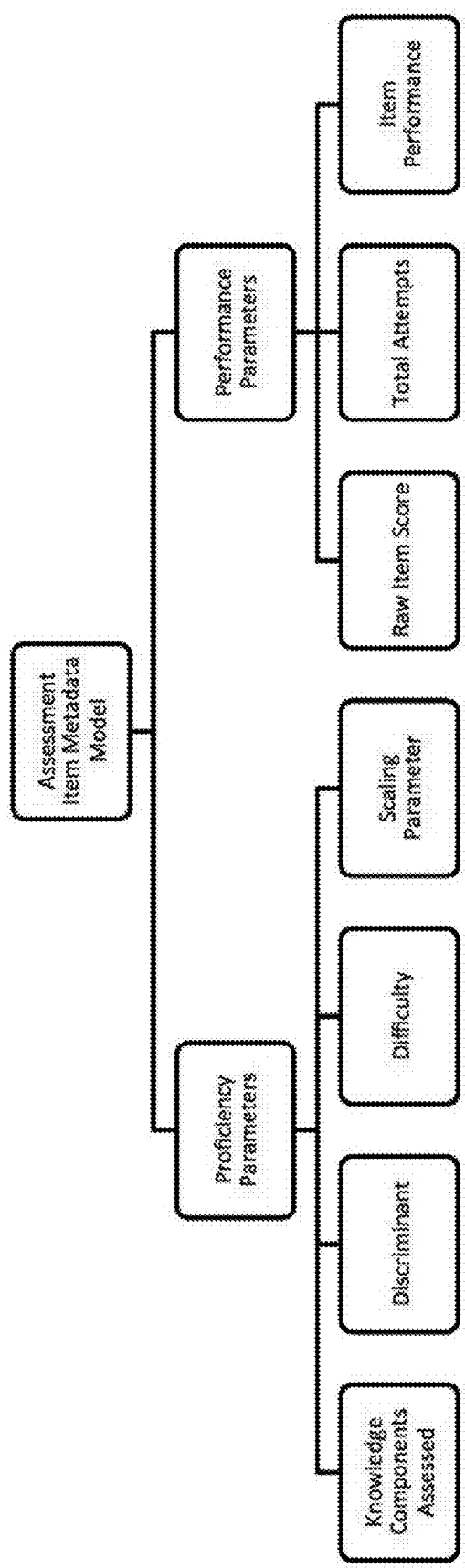
FIG. 2 illustrates assessment metadata in accordance with an embodiment of the present invention.

FIG. 2 illustrates assessment metadata in accordance with an embodiment of the present invention. Every assessment item can be associated with following groups of information such as:

Knowledge Components: Every assessment item is associated with one or more knowledge components that are directly assessed by the assessment item.

Discriminant: Measures the items ability to discriminate between a strong and weak student. Discriminant value is typically between 0 and 1. A value of 1 indicates that an item is capable of differentiating a strong student from a weak student.

Difficulty: Quantitative measure of an item difficulty. The difficulty of a assessment item is typically a number between −3 and +3 with a mean of 0 and standard deviation of 1. A very difficult assessment item has a very low probability of correct student response.

Scaling Parameter: The scaling parameter does not have any practical meaning. It is a number that represents a scaled transformation linking the original observed score scale to the θ scale. The scaling parameter is typically defaulted to 1.

Raw Item Score: Number of students correctly answering the assessment item.

Total Attempts: Total number of students attempting the assessment item.

Item Performance: Indicates the % of assessment items correctly answered by the student.

User Knowledge Profile

Figure 3:
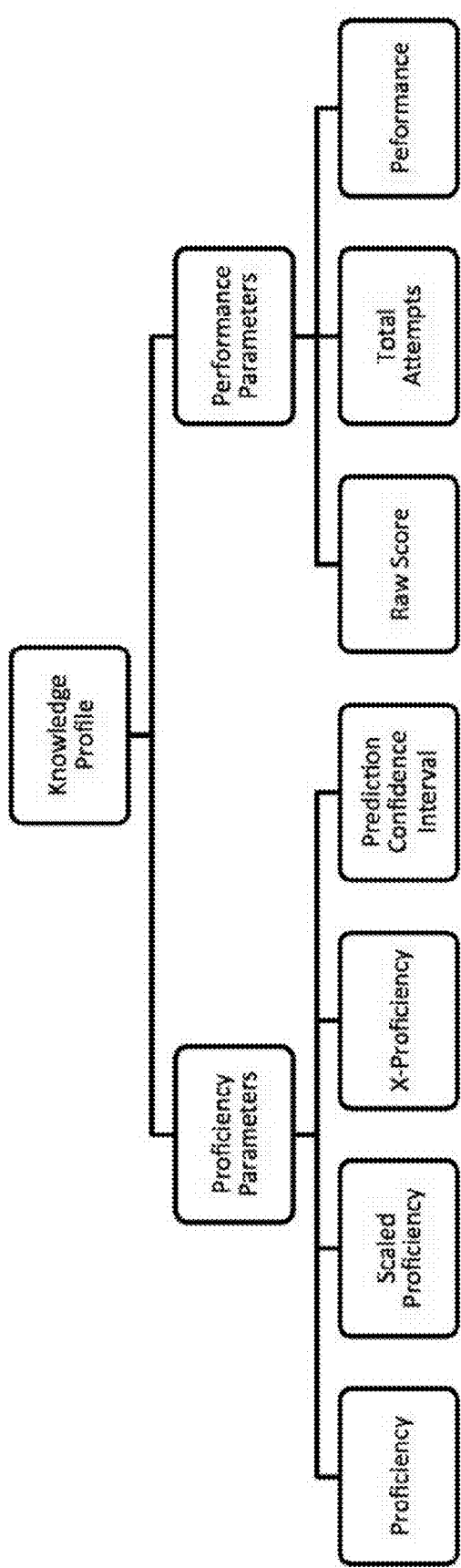
FIG. 3 illustrates knowledge profile metadata in accordance with an embodiment of the present invention.

FIG. 3 illustrates knowledge profile metadata in accordance with an embodiment of the present invention. A knowledge profile is maintained for every student enrolled for a course. The knowledge profile maintains the following information for every knowledge component:

Proficiency: The proficiency, or $\theta$, is a latent trait that measures student proficiency in the knowledge component with a standard normal N(0,1) distribution. This proficiency scale resembles the standard bell curve.

Scaled Proficiency: Conversion of proficiency to a score between 0 and 100 using a cumulative normal distribution function. Scaled proficiency is equivalent to a percentile score.

X-Proficiency: Indicates the probability of the student correctly answering a given assessment item for the knowledge component. If X-proficiency of a student is above the mastery cutoff score, the student is assumed to have "mastered" the knowledge component.

Prediction Confidence Interval: The proficiency prediction is associated with a statistical confidence interval a measure of the reliability of proficiency prediction. The confidence interval is wider when user has attempted fewer assessment items.

Raw Score: Number of assessment items correctly answered by the student.

Assessment Items Attempted: Total number of assessment items answered by the student.

Performance: Indicates the % of assessment items correctly answered by the student.

Predict Function

Figure 4:
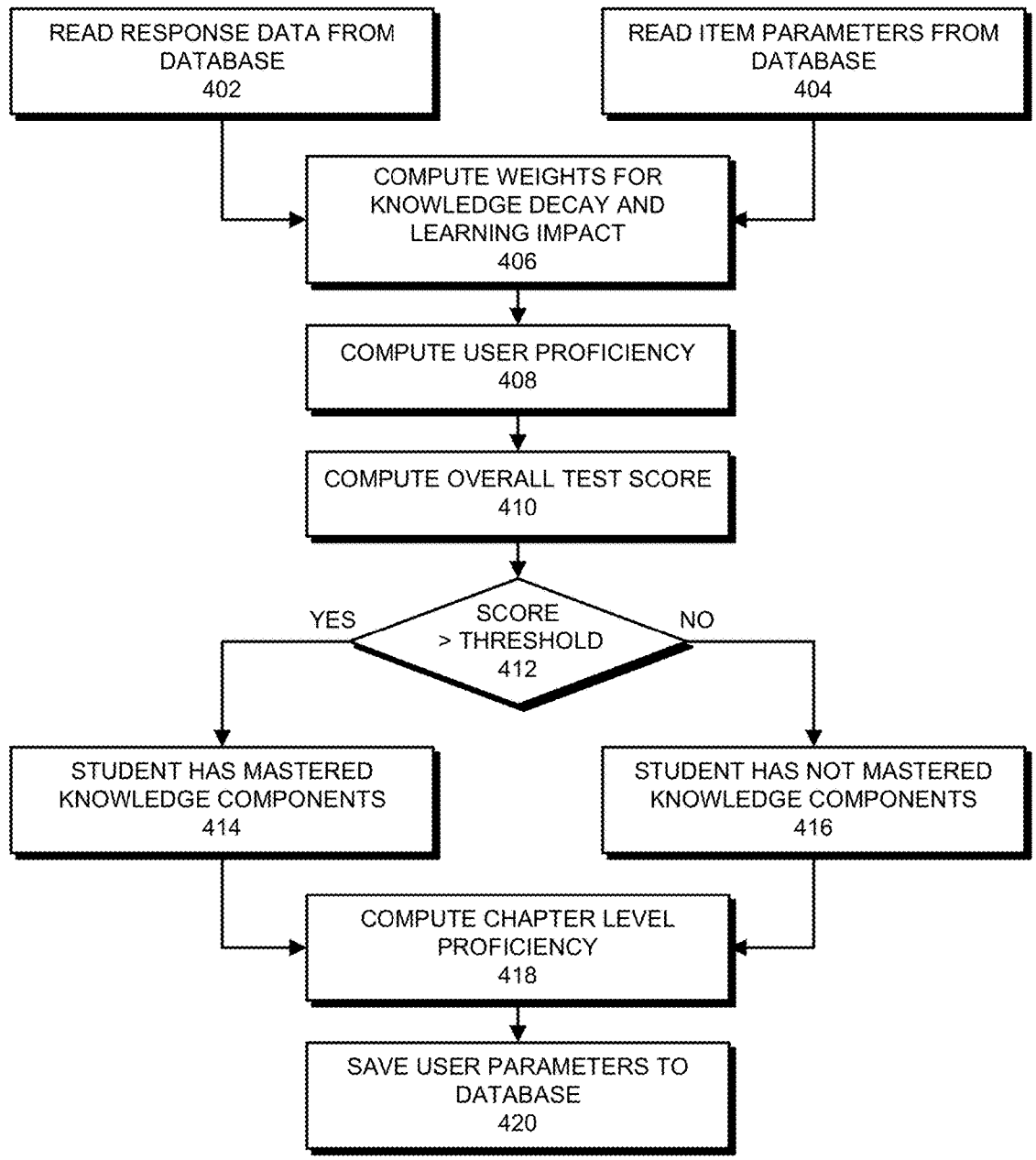
FIG. 4 presents a flow chart illustrating the process of predicting proficiency in accordance with an embodiment of the present invention.

FIG. 4 presents a flow chart illustrating the process of predicting proficiency in accordance with an embodiment of the present invention. The accurate proficiency prediction uses the assessment item response history for a user along with course and content level metadata to predict the proficiency of a user in a knowledge component. The proficiency prediction involves analyzing the student responses to assessment items.

In one embodiment, during operation, the system reads the user response data from the database (operation 402). The system also reads the assessment item parameters from the database (operation 404). The system then computes weights for knowledge decay and learning impact (operation 406). Once the weights have been computed, the system uses the weights to compute user proficiency (operation 408) and overall assessment scores (operation 410).

Once an assessment score is calculated, the system determines if the score is greater than a threshold value (operation 412). If so, the system indicates that the student has mastered the knowledge components in the assessment (operation 414). If not, the system indicates that the student has not mastered the knowledge components in the assessment (operation 416). The system then computers a chapter level proficiency for the user (operation 418) and saves the user parameters to the database (operation 420). The predict function has the following elements:

Score Assessment Items:

As the user answers an assessment item in an assessment, the user's responses are evaluated for correctness and stored as user's response history. The assessment items are scored based on their correctness. The correctness of the response to an assessment item is evaluated by comparing user responses to the correct answer. If the user response matches with the correct answer, the user is awarded a point. Some assessment items, such as multiple select or re-sequence items, may have more than one correct answer. In such a case, the score is evaluated by counting the number of user responses flagged as correct and incorrect as follows:

$$\text{Score} = \left\{ 0, \sum r_{x=1} \le \sum r_{x=0} \frac{\sum r_{x=1} - \sum r_{x=0}}{\sum q_{c=1}}, \sum r_{x=1} > \sum r_{x=0} \right\} \quad (35)$$

where $\Sigma r_{x=1}$ is the count of correct user responses, $\Sigma r_{x=0}$ is the count of incorrect user responses for an assessment, and $\Sigma q_{c=1}$ is the count of correct answers for an assessment item.

The assessment item points are further scaled to account for the consumption of the hint.

Update Assessment Response History:

When the assessment item is stored, the user's assessment history record is updated with every assessment item response. The question metadata identifies one or more knowledge component associated with the assessment item. User assessment history stores every user response for the assessment item ID, including the score, assessment item metadata information, and the timestamp.

Create Knowledge Component Testlet:

The testlet approach involves filtering the past user responses to identify only those assessment item that involves the knowledge component. The testlets are equivalent to a personalized assessment containing a set of assessment items that were administered to the user to assess a knowledge component. If the assessment item is associated with multiple knowledge components, testlets are generated for each knowledge component.

Create Response Matrix:

The response matrix stores user responses for the knowledge component testlet. The actual student points are further scaled to account for learning and retention. The more recent user responses are weighted higher to account for learning and hence more emphasis on recent performance. The response matrix also contains the assessment item metadata including the following parameters required for proficiency prediction:

Parameter $b_j$ (the threshold): Controls the difficulty of the assessment item.

Parameter $a_j$ (the slope): Controls the discriminant of the item.

Parameter $a_j$ (scaling parameter): Regularization parameter to prevent overfitting.

Compute Raw Proficiency:

The raw proficiency prediction is made using the following expression. The user parameters are mean $\mu_i$ and variance $1/\lambda_i$, where $\lambda_i \ge 0$. With this parameterization, the use of $\mu_i$ and $\lambda_i=1$ corresponds to the population prior (standard normal), the use of a greater (lesser) $\lambda_i$ indicates reasons to believe this person has a greater (lesser) skill, the use of a greater (lesser) $\lambda_i$ indicates more (less) confidence in this belief, and setting $\lambda_i=0$ completely disables the use of a prior and revert to ordinary maximum likelihood.

$$\theta_1 = \frac{\lambda_i \mu_i + \sum_{j=1}^{n} a_j^2 \left(b_j + \frac{z_{ij}}{\alpha_j}\right)}{\lambda_i + \sum_{j=1}^{n} a^{2j}} \quad (36)$$

Compute Confidence Interval for Prediction:

The 95% confidence interval for the prediction is made by calculating the standard error. The lower the standard error of the prediction, the lower is the prediction interval and more confident we are in predicting the proficiency.

$$SE(\hat{\theta}_i) = \frac{1}{\sqrt{\lambda_i + \sum_{j=1}^{n} a_j^2}} \quad (37)$$

Fast Predict Function

The fast predict function is invoked when a student answers an individual assessment item. Although the computation of the skills prediction is simple and fast even with a large number of assessment items, a fast proficiency update is required when the user is taking an assessment and the proficiency needs to be updated after every assessment item is answered. The fast prediction function fetches the accurate skill prediction based on all previous answers ($\theta_i^{(old)}$) and its standard error ($SE(\theta_i^{(old)})$). It also caches the denominator used in the computation of the proficiency such that the proficiency computation is optimized for runtime performance.

$$Denom_i^{(old)} = \lambda_i + \sum_{j=1}^{n} a_j^2 \quad (38)$$

When a user answers a new assessment item j, fast proficiency update simply computes the weight. The proficiency prediction, weight (see learning and retention model) and denominator is recomputed using the simple expressions as follows:

$$\hat{\theta}_i^{(new)} = \frac{Denom_i^{(old)} = w_{ij} a_j^2 \left( b_j + \frac{z_{ij}}{a_j} \right)}{Denom_i^{(old)} + w_{ij} a_j^2} \quad (39)$$

$$SE(\hat{\theta}_i^{(new)}) = \frac{\sqrt{Denom_i^{(old)} + w_{ij}^2 a_j^2}}{Denom_i^{(old)} + w_{ij} a_j^2} \quad (40)$$

$$Denom_i^{(new)} = Denom_i^{(old)} + w_{ij} a_j^2 \quad <41>$$

This process takes only a small constant number of operations, and the new prediction is exactly the same as if we had started the computation from zero (if an assessment item has not been repeated). When assessment items have been repeated, the divergence with accurate prediction is fairly small especially when the assessment item was first answered a long time. The accurate proficiency prediction at the end of the test computes the proficiency update accurately even when assessment items have been repeated.

Proficiency Reporting

Proficiency reporting involves displaying the user's knowledge profile in an easy-to-use and actionable report. Proficiency reporting for a student can be used to diagnose and highlight knowledge gaps, i.e. knowledge components, where the student lacks the required proficiency. Proficiency reporting provides the following information to a student:

What is the predicted proficiency at various level of the course and knowledge components: This information is displayed in a hierarchical manner with course level proficiency, chapter/unit proficiency, and the proficiency at the knowledge component level. The students can see the proficiency and visualize the information using easy to understand bar graphs. The course instructors and administrators can view the summarized information for the class with additional ability to drill down student level knowledge profile.

What is the confidence interval for the prediction: The proficiency prediction is associated with a statistical confidence interval a measure of the reliability of proficiency prediction. The confidence interval is wider when user has attempted fewer assessment items. In such a case, the proficiency bars have a higher degree of transparency. As the confidence interval narrows, the opacity of the proficiency bar increases. This can be seen in FIG. 6.

Learn Function

Figure 5:
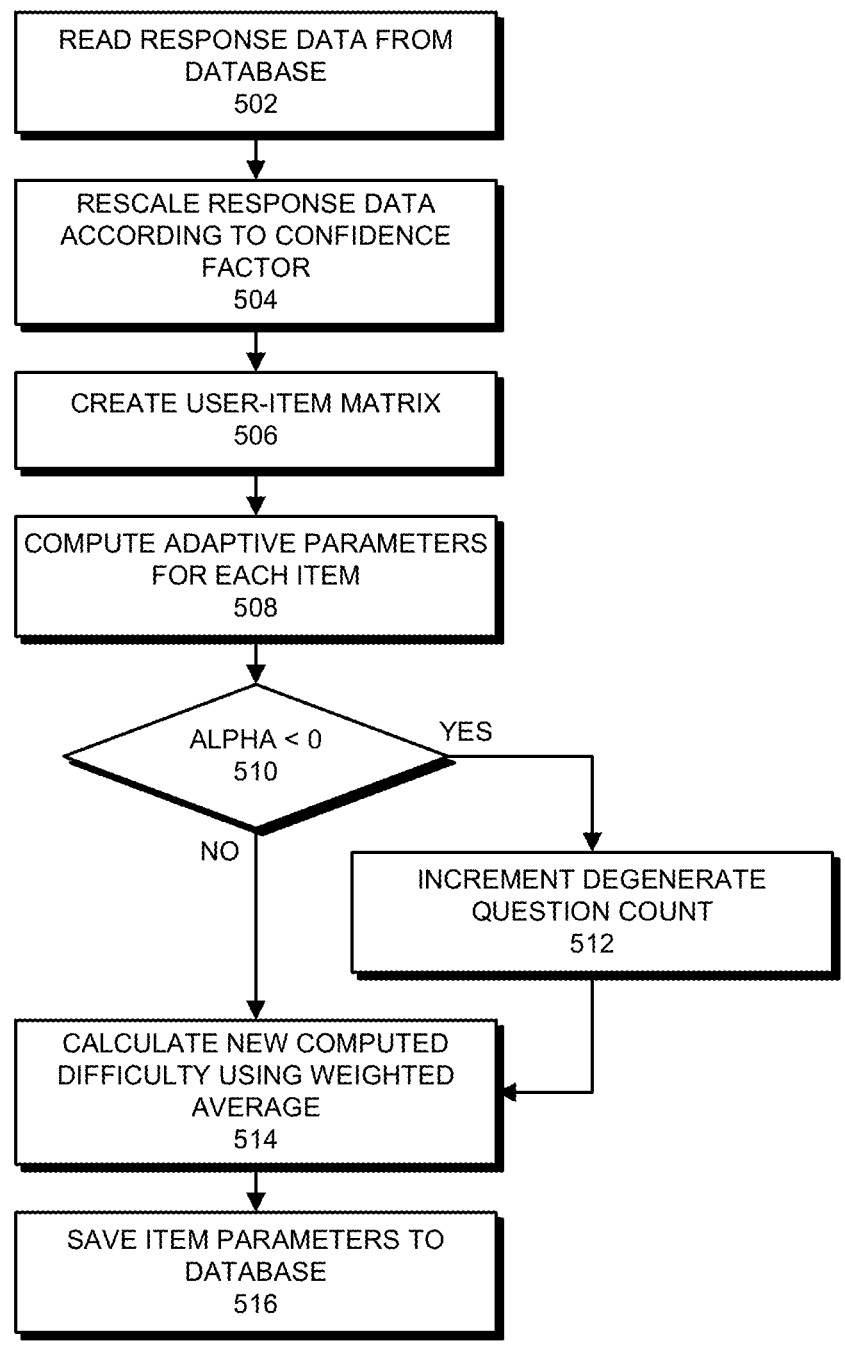
FIG. 5 presents a flow chart illustrating the process of automatically updating assessment parameters in accordance with an embodiment of the present invention.

FIG. 5 presents a flow chart illustrating the process of automatically updating assessment parameters in accordance with an embodiment of the present invention. In one embodiment, during operation, the system reads response data from the database (operation 502). Next, the system rescales the response data according to a confidence factor (operation 504). The system then creates a user-item matrix (operation 506). Once the matrix is created, the system computes adaptive parameters for each item in the user-item matrix (operation 508). Next, the system determines if the alpha value is less than zero (operation 510). If so, the system increments the degenerate question count (operation 512). The system then calculates a new computed difficulty using the weighted average (operation 514). Finally, the system saves the item parameters to the database (operation 516).

Note that the learn function is run periodically in batch mode, and it is used to update the assessment item parameters. The response of student i to assessment item j form the input to the learn function. The learn function then computes the following assessment item parameters using equation 6, 7, 8:

Difficulty (b)—in the interval (−5,5).

Discriminant parameter(a)—in the interval (0,3).

Scaling parameter ($\alpha$).

Number of responses for the assessment item (N).

Computed Difficulty scaled version of b, in the interval (0-100).

Parameter Initialization

In addition, the author optionally assigns a difficulty at the time of creating a new assessment item. Otherwise the initial difficulty is assigned a default value of medium difficulty. The author difficulty is in the range (0100). The initial values for various item parameters are:

Difficulty (b) can be initialized to author difficulty or to 0 (i.e. a 50% chance of a student answer).

Scaling parameter ($\alpha$) can be initialized to 1.

Discriminant parameter (a) can be initialized to a small positive value like 0.1 showing it gives less information.

Degenerate Assessment Items

The slope parameter ($\alpha$) depends on the item-total correlation. This value can be negative which implies weaker students are getting it right compared to more proficient students. These assessment items might be confusing/ill-formed and needs special attention.

Assessment Items with Low Response Count

Assessment items with low number of responses have very high variation in item parameter values. To overcome this adverse effect, a weighted average of author difficulty and computed difficulty is used. The weight depends on the number of responses and a parameterized threshold of 10.

$$\text{New Computed Difficulty}=r*\text{Computed Difficulty}+(1-r)*\text{Author Difficulty} \quad \langle 42 \rangle$$

where $$r = \frac{1}{(1 + e^{-(Number of response - 10)})} \quad \langle 43 \rangle$$

Mixed and Smooth Score

The raw score is defined as the mean of the responses:

$$\overline{X}_i = m_i^{-1} \sum_{j=1}^{n} 1_{ij} X_{ij} \quad \langle 44 \rangle$$

and the latent score as the mean of the expected responses:

$$\hat{X}_i = n^{-1} \sum_{j=1}^{n} E[X_{ij} | \hat{\theta}_i] \quad \langle 45 \rangle$$

The latent score is a monotonic transformation of the skill prediction, and as such is a good indicator of the true skill of a person and gives a better estimate of the probability of a correct answer to a given item than using the raw score. For example, if the person was only assigned easier items, their raw score is inflated compared to the latent score. But there is are two unfortunate aspects for to assigning the latent score to a person:

When an easy item is answered correctly the latent score may remain unchanged as no new information is being obtained.

The ranks of the latent scores do not match well to the ranks of the raw scores.

To lessen this impact, a "mixed score" is introduced:

$$\tilde{X}_i = n^{-1} \sum_{j=1}^{n} \left( 1_{ij} X_{ij} + (1 - 1_{ij}) E[X_{ij} | \hat{\theta}_i] \right) \quad \langle 46 \rangle$$

which is a tradeoff between raw score and the skill prediction. One can get closer to the raw score using a "smoothed score":

$$\tilde{X}_i^* = \omega \overline{X}_i + (1-\omega) \tilde{X}_i \quad \langle 47 \rangle$$

where ω is a smoothing parameter. If it is zero, the result is the "mixed score", and if it is 1, the result is the raw score.

Raw to Scaled Score Conversion

The scaled score is the probability of a student i with proficiency $\theta_i$ scoring more than x on an item j with parameters $a_j$, $b_j$, $\alpha_j$. The probability is given by the cumulative distribution function of a normal distribution. The probability increases with student proficiency θ, whereas assessment item difficulty b and getting a higher score z reduces the probability. The slope parameter a controls how well the item can discriminate between two students. Finally, the scaling parameter α controls the contribution of the score.

$$P(X_{ij} > x | \theta_i, a_j, b_j, \alpha_j) = \frac{1}{\sqrt{2\pi}} \int_{-\infty}^{v} e^{-t^2/2} dt \quad \langle 48 \rangle$$

where $$v = a_j * \left( \theta_i - b_{ij} - \frac{1}{\alpha_j} z_{ij} \right) \quad \langle 49 \rangle$$

Process for Predicting Student Proficiencies in Knowledge Components

Figure 7:
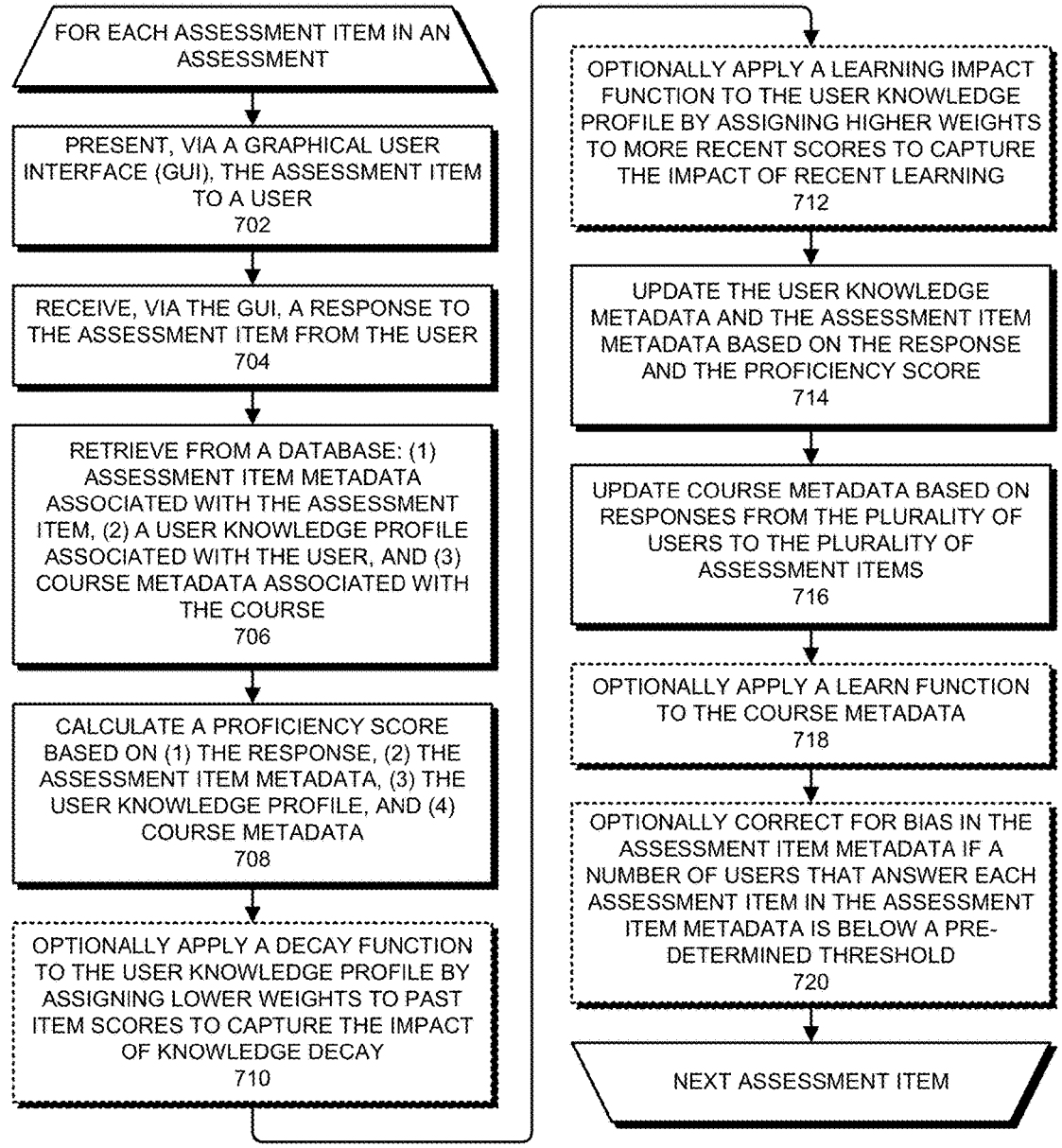
FIG. 7 presents a flow chart illustrating the process of predicting student proficiencies in knowledge components in accordance with an embodiment of the present invention.

FIG. 7 presents a flow chart illustrating a process of predicting student proficiencies in knowledge components in accordance with an embodiment of the present invention. During operation, for each assessment item in an assessment, the system presents, via a graphical user interface (GUI), the assessment item to a user (operation 702). For example a GUI of a client (e.g., client 110 in FIG. 8 described below) can be used to present an assessment item. Next, the system receives, via the GUI, a response to the assessment item from the user (operation 704). The system then retrieves from a database (e.g., database 170 in FIG. 8 described below): (1) assessment item metadata associated with the assessment item, e.g., see FIG. 2 and the associated text, (2) a user knowledge profile associated with the user, e.g., see FIG. 3 and the associated text, and (3) course metadata associated with the course, e.g., see FIG. 1 and the associated text (operation 706). Next, the system calculates a proficiency score based on (1) the response, (2) the assessment item metadata, (3) the user knowledge profile, and (4) course metadata (operation 708). In some embodiments, the system optionally applies a decay function to the user knowledge profile wherein the proficiency computing module assigns lower weights to past item scores to capture the impact of knowledge decay (operation 710). Note that in some embodiments, the system optionally applies a learning impact function to the user knowledge profile wherein the proficiency computing module assigns higher weights to more recent scores to capture the impact of recent learning (operation 712).

Once the proficiency score is calculated, the system updates the user knowledge metadata and the assessment item metadata based on the response and the proficiency score (operation 714). The system also updates course metadata based on responses from the plurality of users to the plurality of assessment items (operation 716). Note that in some embodiments, the system optionally applies a learn function to the course metadata (operation 718). In some embodiments, the system optionally corrects for bias in the assessment item metadata if a number of users that answer each assessment item in the assessment item metadata is below a pre-determined threshold (operation 720).

Figure 8:
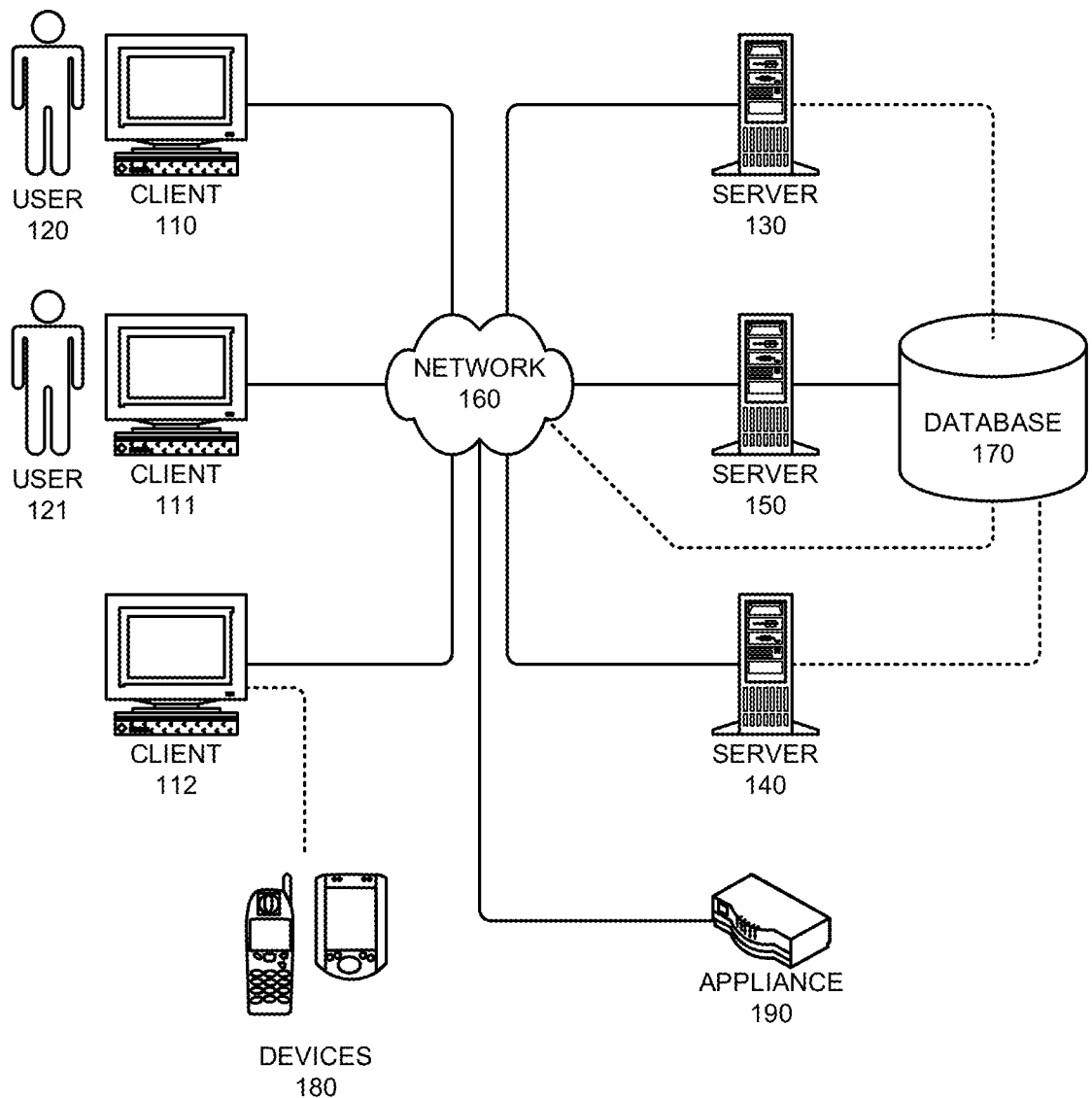
FIG. 8 illustrates a computing environment in accordance with an embodiment of the present invention.

FIG. 8 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart phones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for online learning by calculating proficiency scores in one or more knowledge components in a course based on sparse responses to personalized assessments over time, the method comprising:

for each assessment item in an assessment comprising a plurality of assessment items designed to assess proficiency in the one or more knowledge components in the course, performing at least the following operations in a computer:

presenting, via a graphical user interface (GUI) of the computer, the assessment item to a user;

receiving, via the GUI of the computer, a response to the assessment item from the user;

retrieving, by a proficiency computing module in the computer, (1) assessment item metadata associated with the assessment item, (2) a user knowledge profile associated with the user, and (3) course metadata associated with the course;

calculating, by the proficiency computing module in the computer, a proficiency score based on (1) the response, (2) the assessment item metadata, (3) the user knowledge profile, and (4) course metadata;

wherein the proficiency score is associated with the user and a knowledge component corresponding to the assessment item; and updating, by the proficiency computing module in the computer, the user knowledge profile and the assessment item metadata based on the response and the proficiency score;

updating, by a parameter learning module in the computer, course metadata based on responses from the user to the plurality of assessment items, wherein updating the course metadata further involves the parameter learning module calculating assessment item parameters, assessment item difficulties, and assessment item discriminant factors in a batch mode;

generating a proficiency report for the user that includes (1) a predicted proficiency for each knowledge component in the course, and (2) a confidence interval for each predicted proficiency; and displaying, via the GUI of the computer, the proficiency report to the user, thereby improving online learning.

2. The computer-implemented method of claim 1, wherein calculating the proficiency score further involves applying a decay function to the user knowledge profile wherein the proficiency computing module assigns lower weights to past item scores to capture an impact of knowledge decay.

3. The computer-implemented method of claim 2, wherein calculating the proficiency score further involves applying a learning impact function to the user knowledge profile wherein the proficiency computing module assigns higher weights to more recent scores to capture an impact of recent learning.

4. The computer-implemented method of claim 1, wherein updating the course metadata further involves the parameter learning module applying a learn function to the course metadata, wherein the learn function analyses a plurality of student responses for each assessment item that is associated with the one or more knowledge components and updates the assessment item metadata.

5. The computer-implemented method of claim 1, wherein updating the course metadata further involves modifying parameters used by the proficiency computing module when calculating the proficiency score.

6. The computer-implemented method of claim 1, wherein calculating the proficiency score further involves the proficiency computing module prioritizing proficiency prediction response time over accuracy.

7. The computer-implemented method of claim 6, wherein the method further comprises the parameter learning module smoothing the assessment item parameters.

8. The computer-implemented method of claim 1, wherein calculating the proficiency score further involves the proficiency computing module prioritizing accuracy over proficiency prediction response time.

9. The computer-implemented method of claim 1, wherein the parameter learning module stores initial values for parameters used by the proficiency computing if actual values for item parameters are not known.

10. The computer-implemented method of claim 1, wherein the parameter learning module corrects for bias in the assessment item metadata if a number of users that answer each assessment item in the assessment item metadata is below a pre-determined threshold.

11. The computer-implemented method of claim 1, wherein the method further comprises the proficiency computing module:
  calculating a mixed score which compares the proficiency score to a combination of a mean of all responses to the assessment item and a mean of all expected responses to the assessment item; and
  displaying the mixed score to the user.

12. A non-transitory computer-readable storage medium storing instructions that, when executed by a computer, cause the computer to perform a method for online learning by calculating proficiency scores in one or more knowledge components in a course based on sparse responses to personalized assessments over time, the method comprising:
  for each assessment item in an assessment comprising a plurality of assessment items designed to assess proficiency in the one or more knowledge components in the course, performing at least the following operations in the computer:
    presenting, via a graphical user interface (GUI), the assessment item to a user;
    receiving, via the GUI, a response to the assessment item from the user;
    retrieving (1) assessment item metadata associated with the assessment item, (2) a user knowledge profile associated with the user, and (3) course metadata associated with the course;
    calculating a proficiency score based on (1) the response, (2) the assessment item metadata, (3) the user knowledge profile, and (4) course metadata;
    wherein the proficiency score is associated with the user and a knowledge component corresponding to the assessment item; and
    updating the user knowledge profile and the assessment item metadata based on the response and the proficiency score;
  updating course metadata based on responses from the user to the plurality of assessment items, wherein updating the course metadata further involves a parameter learning module calculating assessment item parameters, assessment item difficulties, and assessment item discriminant factors in a batch mode;
  generating a proficiency report for the user that includes (1) a predicted proficiency for each knowledge component in the course, and (2) a confidence interval for each predicted proficiency; and
  displaying, via the GUI of the computer, the proficiency report to the user, thereby improving online learning.

13. The non-transitory computer-readable storage medium of claim 12, wherein said calculating the proficiency score further involves applying a decay function to the user knowledge profile, wherein lower weights are assigned to past item scores to capture an impact of knowledge decay.

14. The non-transitory computer-readable storage medium of claim 13, wherein said calculating the proficiency score further involves applying a learning impact function to the user knowledge profile wherein higher weights are assigned to more recent scores to capture an impact of recent learning.

15. The non-transitory computer-readable storage medium of claim 12, wherein updating the course metadata further involves the parameter learning module applying a learn function to the course metadata, wherein the learn function analyses a plurality of student responses for each assessment item that is associated with the one or more knowledge components and updates the assessment item metadata.

16. The non-transitory computer-readable storage medium of claim 12, wherein updating the course metadata further involves modifying parameters that are used when calculating the proficiency score.

17. The non-transitory computer-readable storage medium of claim 12, wherein said calculating the proficiency score further involves prioritizing proficiency prediction response time over accuracy.

18. The non-transitory computer-readable storage medium of claim 12, wherein said calculating the proficiency score further involves prioritizing accuracy over proficiency prediction response time.

19. An apparatus configured for online learning by calculating proficiency scores in one or more knowledge components in a course based on sparse responses to personalized assessments over time, the apparatus comprising:
  a memory;
  a processor;
  a graphical user interface (GUI); and
  a non-transitory computer-readable storage medium storing instructions that, when executed on the processor, cause the apparatus to perform a method comprising:
    for each assessment item in an assessment comprising a plurality of assessment items designed to assess proficiency in the one or more knowledge components in the course, performing at least the following operations:
      presenting, via the GUI, the assessment item to a user;
      receiving, via the GUI, a response to the assessment item from the user;
      retrieving (1) assessment item metadata associated with the assessment item, (2) a user knowledge profile associated with the user, and (3) course metadata associated with the course;
      calculating a proficiency score based on (1) the response, (2) the assessment item metadata, (3) the user knowledge profile, and (4) course metadata;
      wherein the proficiency score is associated with the user and a knowledge component corresponding to the assessment item; and
      updating the user knowledge profile and the assessment item metadata based on the response and the proficiency score;
    updating course metadata based on responses from the user to the plurality of assessment items, wherein updating the course metadata further involves a parameter learning module calculating assessment item parameters, assessment item difficulties, and assessment item discriminant factors in a batch mode;

generating a proficiency report for the user that includes (1) a predicted proficiency for each knowledge component in the course, and (2) a confidence interval for each predicted proficiency; and displaying, via the GUI, the proficiency report to the user, thereby improving online learning.

* * * * *